(12) United States Patent
Alessi

(10) Patent No.: US 10,698,132 B2
(45) Date of Patent: Jun. 30, 2020

(54) SYSTEM AND METHOD FOR CONFIGURING SAFETY LASER SCANNERS WITH A DEFINED MONITORING ZONE

(71) Applicant: Datalogic IP Tech S.r.l., Lippo di Calderara di Reno (Bologna) (IT)

(72) Inventor: Nicola Alessi, Bologna (IT)

(73) Assignee: DATALOGIC IP TECH S.R.L., Lippo di Calderara di Reno (BO) (IT)

( * ) Notice: Subject to any disclaimer, the term of this patent is extended or adjusted under 35 U.S.C. 154(b) by 138 days.

(21) Appl. No.: 15/957,709

(22) Filed: Apr. 19, 2018

(65) Prior Publication Data
US 2019/0324169 A1  Oct. 24, 2019

(51) Int. Cl.
| | | |
|---|---|---|
| *G01S 17/06* | (2006.01) | |
| *G01V 8/10* | (2006.01) | |
| *G08B 21/18* | (2006.01) | |

(52) U.S. Cl.
CPC ............... *G01V 8/10* (2013.01); *G08B 21/18* (2013.01)

(58) Field of Classification Search
CPC .......... G06K 9/00335; G08B 13/19602; G08B 13/19613; G08B 13/19652; G08B 13/19663; G08B 13/19689; G08B 21/0476; G08B 21/18; G01V 8/12; G01V 8/10; G01S 17/06; G01S 7/4817; G01S 7/497
USPC ........................................................ 250/221
See application file for complete search history.

(56) References Cited

U.S. PATENT DOCUMENTS

| | | | |
|---|---|---|---|
| 5,455,669 | A | 10/1995 | Wetteborn |
| 8,018,579 | B1 | 9/2011 | Krah |
| 8,907,792 | B2 | 12/2014 | Mezger |
| 8,933,593 | B2 | 1/2015 | Haberer et al. |
| 9,423,244 | B2 * | 8/2016 | Haberer .................. G01V 8/12 |
| 9,846,234 | B2 | 12/2017 | Mezger et al. |
| 2011/0267262 | A1 | 11/2011 | Gollier |
| 2012/0051588 | A1 | 3/2012 | McEldowney |
| 2012/0062867 | A1 | 3/2012 | Shibatani |
| 2012/0249997 | A1 | 10/2012 | Matsumoto |
| 2015/0212202 | A1 | 7/2015 | Mezger et al. |
| 2016/0040827 | A1 | 2/2016 | Merx |

OTHER PUBLICATIONS

European Search Report, European Patent Application No. 19169422.3, Datalogic IP Tech S.r.l., dated Aug. 13, 2019, 9 pages.

\* cited by examiner

*Primary Examiner* — Que Tan Le
(74) *Attorney, Agent, or Firm* — Stoel Rives LLP

(57) ABSTRACT

The disclosure relates to a method for simplifying the configuration process of setting monitoring zones for a laser scanner. The method includes activating a configuration mode of the laser and sampling a field of view to establish a frame of reference including the target item to be monitored and other static items present in the field of view. To configure the monitoring zone, an operator may enter the area and sends signals to the laser scanner via a remote controller at a variety of vertex points. The signals for each of the vertex points are thereafter analyzed by the laser scanner to determine positional data and establish the boundaries of the monitoring zone for the laser scanner.

20 Claims, 3 Drawing Sheets

SYSTEM AND METHOD FOR CONFIGURING SAFETY LASER SCANNERS WITH A DEFINED MONITORING ZONE

BACKGROUND

The present disclosure relates generally to systems and methods for configuring laser scanners, and in particular, to such systems and methods for facilitating the configuration process and defining a safety or monitoring region of the laser scanner.

Generally speaking, a conventional safety laser scanner includes a plurality of light beams generated by one or more light transmitters. In some scanners, the light beams may be stacked or arranged in such a way to direct light along a vertical or horizontal plane to create a light curtain. When a person or object interrupts the light beam or light curtain, such as by walking through or extending a limb into the path of light, the laser scanner detects the disruption. Upon detecting the disruption, the laser scanner may in turn sound an alarm or send a signal to a remote computer to alert someone of the disturbance.

Such laser scanners may be used in a variety of situations. For example, laser scanners may be used to protect valuable items, such as artwork, vaults, and safes, to protect against entry into private buildings or secure areas, or to control and monitor access to work spaces where dangerous machines may be in operation. In any of these or other similar situations, the scanners may be used to monitor the protected area and raise an alarm when someone enters.

Typically, to employ such laser scanners, a target monitoring zone of the laser scanner is first configured. Many conventional methods have been used to configure this monitoring zone, however, these methods are typically complex and require trained personnel and/or specialized equipment. For example, one method involves using a graphical user interface and a computer using specialized software to program the coordinates of the monitoring zone to configure the laser scanner. Other solutions involve directly inputting coordinate information into the laser scanner, however, such methods are useful only for defining very simply geometry (such as square or rectangular zones) and still require trained personnel to execute and equipment to accurate identify the coordinate information. Furthermore, for laser scanners that are fixed at locations that are difficult to reach (e.g., on high ceilings or walls), this method may be impractical.

Accordingly, the present inventor has determined that it would be desirable to have an improved and simplified method of configuring a monitoring zone for a laser scanner that does not require the use of complex software or skilled technicians. In addition, the present inventor has identified a need for such a configuring method that may be easily and quickly completed by an ordinary person without the need for specialized training. Additional aspects and advantages of such systems will be apparent from the following detailed description of example embodiments, which proceed with reference to the accompanying drawings.

Understanding that the drawings depict only certain embodiments and are not, therefore, to be considered limiting in nature, these embodiments will be described and explained with additional specificity and detail with reference to the drawings.

DETAILED DESCRIPTION OF DISCLOSED EMBODIMENTS

With reference to the drawings, this section describes particular embodiments and their detailed construction and operation. The embodiments described herein are set forth by way of illustration only and not limitation. The described features, structures, characteristics, and methods of operation may be combined in any suitable manner in one or more embodiments. In view of the disclosure herein, those skilled in the art will recognize that the various embodiments can be practiced without one or more of the specific details or with other methods, components, materials, or the like. In other instances, well-known structures, materials, or methods of operation are not shown or not described in detail to avoid obscuring more pertinent aspects of the embodiments.

In the following description of the figures and any example embodiments, certain embodiments may describe use of the laser scanner to monitor safety areas surrounding a machine to protect personnel and reduce the likelihood of inadvertent injuries when using large or dangerous machines. It should be understood that these examples are merely example uses for the described system and should not be considered as limiting. In other embodiments, the laser scanner may be used for any one of a variety of purposes, such as for monitoring access to secure areas, protecting valuables, or any other suitable purpose.

FIGS. 1-6 collectively illustrate details relating to a method for configuring a monitoring zone for a laser scanner. As briefly mentioned previously, graphical user interfaces combined with computer technology have been used in previous systems to configure the monitoring zones. One disadvantage of such systems is that using the graphical user interface and computers require specialized skills for appropriate configuration. Typically, configuring the monitoring zones is the most time-consuming activity in the configuration process of a safety laser scanner system. Accordingly, simplifying the configuration process not only eliminates a need for having trained personnel to configure the laser scanner, but it also reduces the overall configuration time for the laser scanner system. Moreover, a simplified configuration process also allows for easy configuration when more than a single area needs to be configured, such as for systems using a cluster of scanners to monitor multiple zones.

As is further described in detail below, the disclosed subject matter relates to a simplified method for configuring the monitoring zone of the laser scanner so as to avoid conventional configuration methods that rely heavily on the use of complex graphical user interfaces and expensive equipment. Rather, the disclosed method provides simple and user friendly steps to configure the monitoring zone of the laser scanner with relative ease. Additional details and information of these embodiments is further described below with specific reference to the figures.

Figure 1:
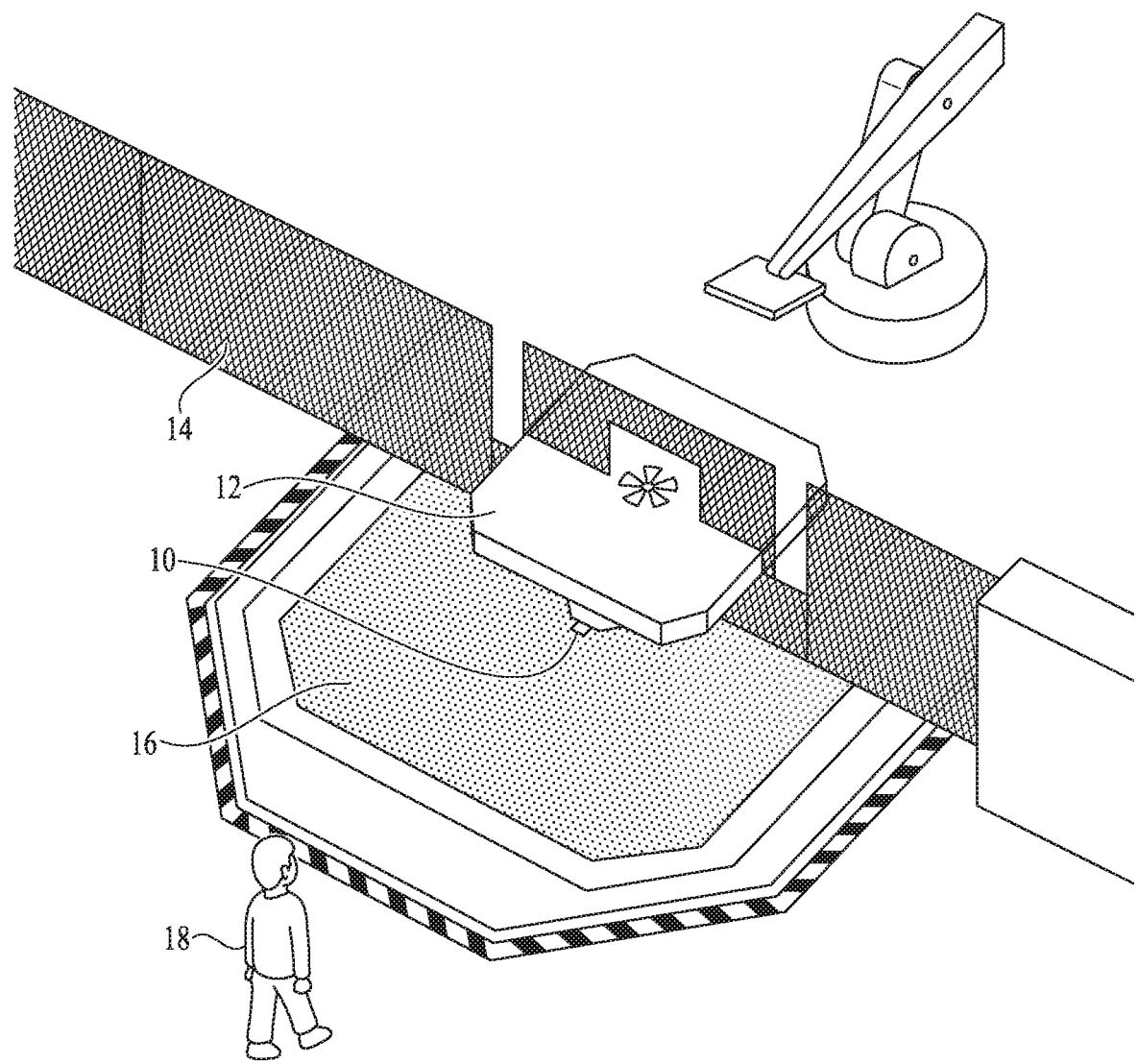
FIG. 1 is a schematic illustration of a laser scanner in an example environment of use in accordance with one embodiment.

FIG. 1 is a schematic representation of a laser scanner 10 employed in an example environment of use to protect against possible injury that may be caused if personnel nears the machine 12 without proper precaution. As illustrated in FIG. 1, much of the danger that may be caused by the machine can be avoided by restricting access to the machine 12 itself and its surrounding area, such as by the fence 14 or by use of other physical barriers. However, for some machines or environments, a fence 14 may not be feasible to protect against all possible injuries. Accordingly, other cautionary measures may need to be taken, such as using a safety laser scanner 10, to ensure that the area is properly monitored and is as safe as possible. As mentioned previously, FIG. 1 and the related written description is merely intended to provide an example environment of use and is not meant to be limiting. One having ordinary skill in the art will understand that the same principles may be applied to different environments without departing from the core of the disclosed subject matter.

With reference to FIG. 1, the laser scanner 10 may be arranged in any suitable position to form a light curtain for monitoring a zone 16 relative to the machine 12. When personnel 18 nears the machine 12 and enters the zone 16, the light curtain is disrupted. At this point, the laser scanner 10 detects the presence of the person and takes suitable action, which may include sounding an alarm, deactivating the machine, and/or alerting appropriate personnel. As mentioned previously, the monitoring zone 16 may be initially configured for the laser scanner 10 to identify a target region surrounding the machine 12 that is under surveillance by the laser scanner 10. One example configuration method 100 is described below with collective reference to FIGS. 2-4.

Figure 2:
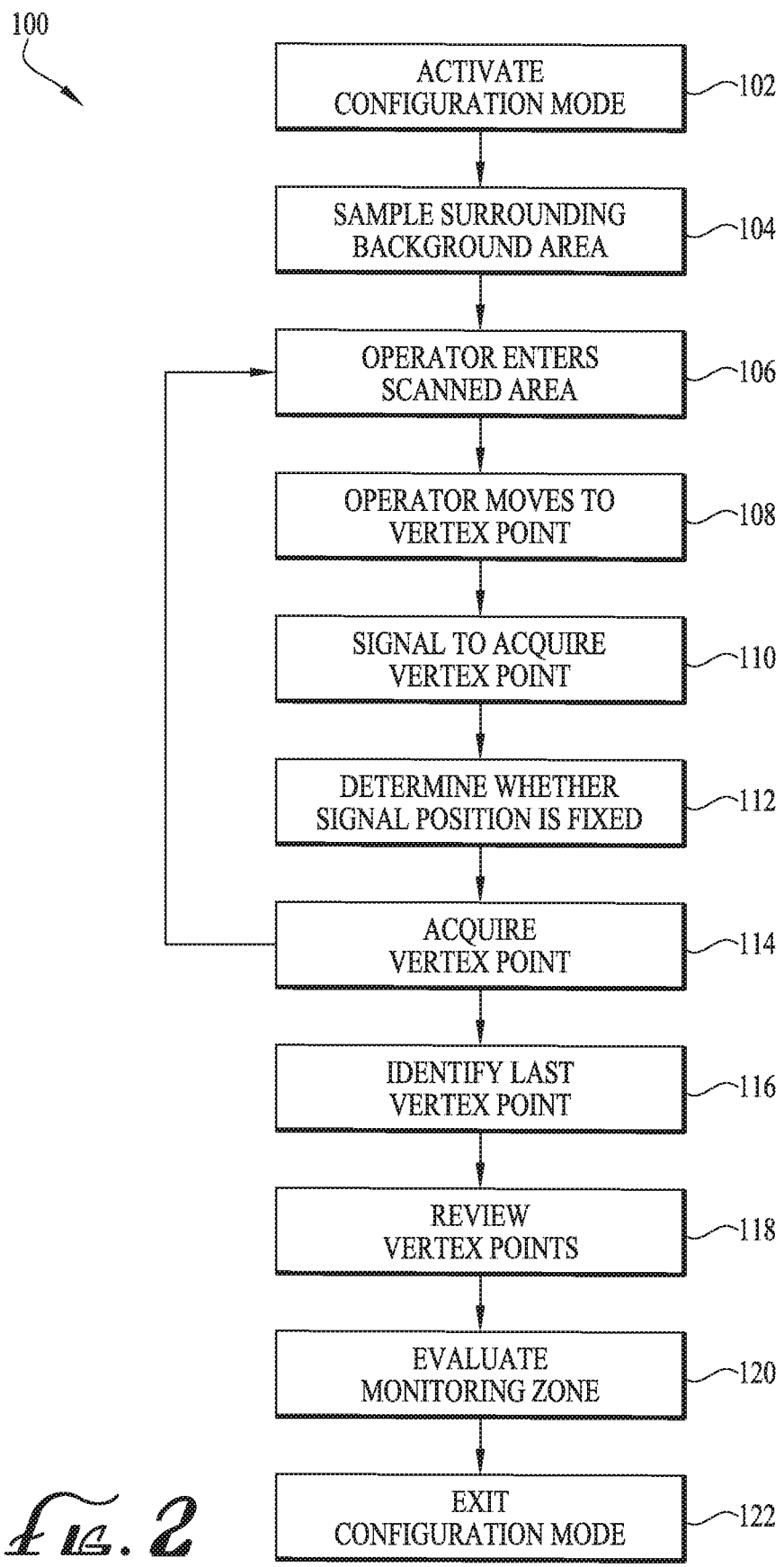
FIG. 2 is a block diagram illustrating an example method for configuring a laser scanner in accordance with one embodiment.

FIG. 2 is a block diagram illustrating an example embodiment of a method 100 for configuring a laser scanner. The following proceeds with a description of the various steps in method 100. It should be understood that while the steps in the method are presented and described in a particular order, the order is for convenience only and is not meant to be limiting. In some embodiments, the steps may be performed in an order different than what is specified herein. In addition, the method may include additional steps and features other than those included herein. In some embodiments, the method may combine certain steps or omit certain steps altogether.

The method 100 begins with initiating the laser scanner in a configuration mode. At step 102, the configuration mode of the laser scanner is activated, such as by pressing a button on the laser scanner or by executing a command on a graphical user interface on a display of the laser scanner or on a remote device in communication with the laser scanner. In the configuration mode, the laser scanner is operable to capture the various vertex points/corners or other coordinate points that will comprise the edges of the monitoring zone once the method 100 is completed. Accordingly, the laser scanner is ready for input of a series of two-dimensional or three-dimensional points to define the area or volume to be monitored. At step 104, the laser scanner samples the surrounding background area and stores the background field of view of the laser scanner. In some embodiments, the background field of view may comprise the data relating to positions of various static objects located within the field of view of the laser scanner. These static objects may be walls, pillars, machinery, pieces of furniture, and so on. In a particular case, a background field of view of a laser scanner may present no static objects, if all such objects are out of the laser scanner field of view limits. Accordingly, the background field of view of the laser scanner, stored during this step, may comprise various static items or may comprise no static items. The background field of view is recorded and stored for reference so as to avoid false alarms once the monitoring zone is set and/or to avoid a wrong processing and closure of the polygonal safety area after the vertex points have been acquired. After completion of steps 102 and 104, the monitoring zone is ready to be configured as described below.

In step 106, the operator enters or moves near the area to begin the process of defining the monitoring zone. At step 108, the operator introduces a target item, which may be a handheld device or may be a part of the human body as further described below, into the field of view of the laser scanner and moves to a first vertex of the monitoring zone to be defined and stops. As the operator enters, the laser scanner tracks a position of the operator and the target item as moving objects in the field of view. At step 110, once the operator has reached the first vertex point, the operator sends a signal to the laser scanner via a remote controller to record the coordinate position of the first vertex point through the evaluation of the distance and the angular position of the operator with respect to the position of the safety laser scanner. In other words, the vertex point corresponds to the physical location of the user (and the target item) relative to the safety laser scanner. The remote controller may operate through one or more buttons, a touch screen, or a voice command, such as using a wireless microphone. The voice command may be given by the operator or other personnel working with the operator. In some embodiments, the signal may be sent via a wireless remote control or mobile computer in communication with the laser scanner. In some embodiments, the remote control may provide the signal to an external control unit, such as computer, industrial controller, master laser scanner in a master-slave configuration and so on, in communication with the laser scanner. In other embodiments, the operator may place a known pattern or other object in the vertex point to be defined which can be identified by the laser scanner instead of positioning himself at the vertex point.

In one embodiment, the operator may hold a wireless remote controller and move to the first vertex point. Once at the first vertex point, the operator activates the wireless controller to communicate with the laser scanner and precisely define a coordinate position of the first vertex point. One advantage of using a remote wireless controller is that the operator is able to initiate communication with the laser scanner to define the vertex points as opposed to having the laser scanner search for the operator or for an object in the operator's possession. This method allows the operator more precise control and expedites the configuration process. Another advantage of using a wireless controller to communicate the vertex points from the operator to the laser scanner is that the operator has freedom of movement that is essentially unhindered. Moreover, this method also permits the user to be static at the correct position, thereby ensuring that the vertex point is captured with a higher precision as compared to other solutions which may require additional movement by the operator. In addition, this method may provide a faster configuration process, since the user does not need to place a reference object at the various vertex points or activate the laser scanner each time the reference object is moved among the various vertex points. Accordingly, by being able to wirelessly signal when the vertex points have been acquired by the laser scanner, the shape of the monitoring zone may better reflect the natural movement of the operator relative to the dangerous machine so as to create an accurate monitoring zone that accounts for real-world use.

Once the laser scanner receives the signal, at step 112, the laser scanner determines whether the position of the signal is fixed (e.g., whether the operator is standing in a fixed position) to accurately obtain the vertex point. This step may be accomplished in any one of a variety of suitable means. For example, in some embodiments, the operator may transmit multiple signals with the wireless remote control in short succession, and the signals may be analyzed to determine whether the coordinate data is the same or overlaps for each signal. In other embodiments, once the laser scanner receives the signal, it may also determine whether the operator is a moving object in its field of view at the time of receiving the signal.

At step 114, the laser scanner acquires or captures the vertex point based on the position of the operator (and the target item) as communicated via a signal from the remote control (or based on a reference object located at the vertex point). The laser scanner may communicate a signal to the operator indicating that the vertex point was acquired or obtained. For example, in some embodiments, the laser scanner may transmit a visible and/or audible signal that can be seen or heard by the operator. In other embodiments, the laser scanner may illuminate an indicator on the remote control to confirm that the vertex point was successfully obtained. In some embodiments, the operator may have the option to discard the acquired vertex point if a mistake was made, or if the vertex point needs to be repositioned. Methods steps 108 through 114 may be repeated a number of times (i.e., the operator and target item may move through a plurality of positions in the field of view) to identify additional vertex points for the monitoring zone in the same or similar fashion as described.

Once all vertex points have been identified and acquired by the laser scanner, at step 116, the operator may transmit a signal to the laser scanner to identify the latest vertex point in the series as the last point. At this point, the laser scanner exits the configuration mode, as the configuration of the monitoring zone has been completed. After input of all the vertex points, at step 118, the laser scanner aggregates all the positional coordinates for the respective vertex points and determines the monitoring zone for the laser scanner. The laser scanner further reviews the vertex points and monitoring zone to check the consistency and geometry of the monitoring zone. For most cases, as long as the boundaries of the vertex points do not overlap one another then the monitoring zone is acceptable.

Figure 3:
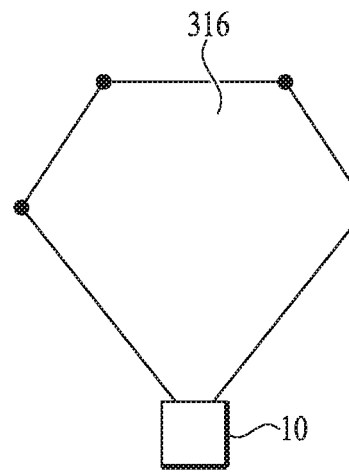
FIG. 3 is a schematic drawing of an acceptable monitoring zone of the laser scanner in accordance with one embodiment.
Figure 4:
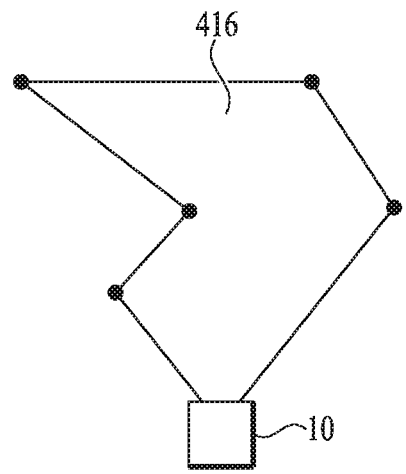
FIG. 4 is a schematic drawing of an unacceptable monitoring zone of the laser scanner in accordance with one embodiment.

For example, FIG. 3 is a schematic illustration of a monitoring zone 316 having a generally polygon shape that forms an acceptable monitoring zone since none of the vertex points create overlapping sections for the laser scanner 10. FIG. 4 is a schematic illustration of a monitoring zone 416 that has an irregular shape, where the monitoring zone 416 has vertex points positioned to create overlapping regions that cannot be appropriately monitored by the laser scanner. Accordingly, the laser scanner would consider the monitoring zone illustrated in FIG. 3 as acceptable, while the monitoring zone in FIG. 4 is unacceptable and would require a reconfiguration. In some embodiments, one or more static objects inside the background field of view of the laser scanner may be surrounded by vertex points. In such instances, the monitoring zone needs to account for the position of the static objects so that the zone is closed around the objects themselves. Additional information regarding this embodiment is described in further detail with reference to FIGS. 5 and 6.

Figure 5:
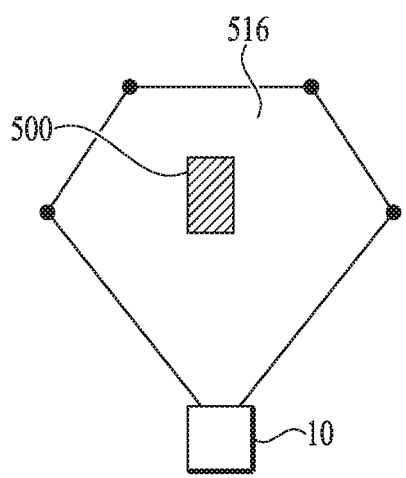
FIG. 5 is a schematic drawing of an unacceptable monitoring zone of the laser scanner in accordance with one embodiment including the presence of a fixed obstacle.
Figure 6:
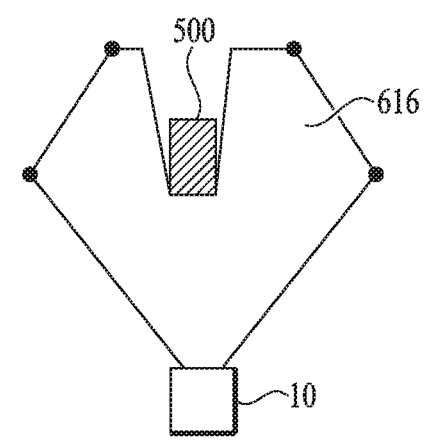
FIG. 6 is a schematic drawing of an acceptable monitoring zone of the laser scanner in accordance with one embodiment including the presence of a fixed obstacle.

FIGS. 5 and 6 collectively illustrate another embodiment of acceptable and unacceptable monitoring zones in the presence of a fixed obstacle 500. For example, with reference to FIG. 5, the acquired vertex points for the laser scanner 10 are set such that the compiled monitoring zone 516 encompasses the fixed object. One issue with this configuration for the monitoring zone 516 is that the field-of-view of the laser scanner 10 is obscured by the fixed obstacle. Accordingly, the laser scanner 10 is unable to detect the presence of personnel within the monitoring zone 516, if the personnel happens to be adjacent or behind the fixed obstacle 500.

FIG. 6 illustrates one embodiment of an acceptable monitoring zone 616 for handling the presence of fixed obstacles 500. With reference to FIG. 6, the vertex points are set such that the fixed obstacle 500 remains outside of the monitoring zone 616, thereby allowing the laser scanner 10 to accurately monitoring all areas of the zone 616 without interference from the fixed obstacle 500. In some embodiments, a second laser scanner (not shown) may be used to monitor the rear portion of the fixed obstacle 500, such that the two laser scanners together have complete coverage of the region, if desired.

It should be understood that FIGS. 5-6 illustrate example embodiments of acceptable and unacceptable monitoring zones for handling the presence fixed obstacles. In other embodiments, various other configurations for the monitoring zones may be made without departing from the principles of the disclosed subject matter.

Once the acquired monitoring zone has been completed and is evaluated as being acceptable, at step 120, the laser scanner may display a graphical representation of the acquired monitoring zone to the operator for approval. If the displayed monitoring zone is accepted, then at step 122, the configuration mode is exited and the laser scanner is ready for deployment. If the displayed monitoring zone is rejected, then one or more of the vertex points may be discarded and the monitoring zone reconfigured until it is acceptable. In some embodiments, such as where a cluster of scanners is being configured (e.g., one master scanner and three slave scanners), the method 100 may be repeated multiple times to configure each of the slave scanners.

In some embodiments, certain of the method steps described above may be altered, varied, and/or omitted without departing from the principles of the disclosed subject matter. For example, in one embodiment, the method may include the same or similar process as described in steps 102, 104, and 106. At step 108, depending on the detection capabilities of the laser scanner, the operator can stand with his or her entire body in the monitoring zone (as described above with reference to method 100), where the laser scanner detects the body of the operator as the operator moves throughout the monitoring zone. However, in other embodiments, the operator may instead enter the monitoring zone with only an arm or a hand instead of a body. This configuration approach may be useful when the monitoring zone includes a vertical area. Examples of vertical areas to be monitored may include doors or perimeter walls, through which an operator may not pass or access, as well as windows or openings in proximity to an operating machinery where the operator must not reach near or otherwise introduce part of his body. In such embodiments, the configuration of the monitoring zone becomes highly intuitive because the operator merely needs to reach into the monitoring zone with a hand or arm to delineate the regions that need to be monitored by the laser scanner to ensure that personnel is alerted of possible dangers in those regions when the dangerous equipment is operating. Once the hand or arm is at a distance that the operator determines is an acceptable border of the monitoring zone, the operator may signal the laser scanner to obtain and store that point. Once all points have been marked and stored by the laser scanner, then the operator may provide a signal to the laser scanner to exit the configuration mode in a similar fashion as described above. Thereafter, the appropriate polygonal monitoring zone may be created in a similar fashion as described previously.

In another embodiment, the process of capturing vertex points for ultimately configuring the target monitoring zone described in steps 108, 110, 112, and 114 may be a more dynamic process. In such embodiments, an operator may approach the laser scanner and in a process similar to step 110, the operator may signal to the laser scanner (e.g., such as via a wireless remote) that the operator has reached the first vertex point for commencing the process of configuring the monitoring zone. Once the laser scanner has received the signal and acquired the positional coordinate of the initial vertex point, the operator may mark the boundaries of the monitoring zone simply by walking or moving. In some embodiments, the boundaries may be marked by sending signals via a wireless remote control while walking. In other embodiments, the boundaries of the monitoring zone may be marked without requiring the operator to send any further signals to the laser scanner to mark individual vertex points. In such embodiments, after the operator signals the first vertex point, the laser scanner tracks the continuous movement of the user and evaluates the distance and angular position of the user. As the user moves, the laser scanner monitors the user's movements and, in this fashion, acquires a relatively large number of contour points, each of the points being additional positional coordinates for a plurality of respective vertex points. The contour points may be automatically acquired at predetermined time intervals based on the plurality of positions of the target item and independent of further activation of the remote controller. Once the operator has completed the boundary, the operator may use the remote controller to send a second signal to the laser scanner that the configuration process is complete. Thereafter, the laser scanner compiles all the contour points and configures the monitoring zone for approval by the operator in the same or similar fashion as described previously with reference to the method 100.

It is intended that subject matter disclosed in portion herein can be combined with the subject matter of one or more of other portions herein as long as such combinations are not mutually exclusive or inoperable. In addition, many variations, enhancements and modifications of the imager-based optical code reader concepts described herein are possible.

The terms and descriptions used above are set forth by way of illustration only and are not meant as limitations. Those skilled in the art will recognize that many variations can be made to the details of the above-described embodiments without departing from the underlying principles of the invention.

The invention claimed is:

1. A method of configuring a laser scanner with a defined monitoring zone, the method comprising:
   activating a configuration mode of the laser scanner;
   sampling, via the laser scanner, a field of view of the laser scanner;
   storing a background field of view of the laser scanner;
   monitoring, via the laser scanner, a target item in the field of view of the laser scanner;
   receiving at the laser scanner, a signal from a remote controller;
   acquiring, via the laser scanner, a first positional coordinate of the target item responsive to the signal received from the remote controller;
   acquiring, via the laser scanner, a positional coordinate for each of a plurality of positions of the target item within the field of view when the target item is located at the plurality of different positions; and
   aggregating the acquired positional coordinates to correspond to respective vertex points to determine the defined monitoring zone for the laser scanner.

2. The method of claim 1, wherein the target item is an object held by a person entering the field of view of the laser scanner.

3. The method of claim 1, wherein the target item is part of a human body entering in the field of view of the laser scanner.

4. The method of claim 1, further comprising displaying, via the laser scanner, a graphical representation of the defined monitoring zone for the laser scanner.

5. The method of claim 1, further comprising:
   analyzing the positional coordinates corresponding to each of the respective vertex points of the defined monitoring zone; and
   determining whether the defined monitoring zone is acceptable based on the positional coordinates of the vertex points.

6. The method of claim 1, further comprising generating a second signal, via the laser scanner, indicating a successful acquisition of the positional coordinate.

7. The method of claim 1,
   wherein acquiring the first positional coordinate corresponds to an initial vertex point;
   wherein acquiring additional positional coordinates corresponding to a plurality of respective vertex points is performed at predetermined time intervals based on the plurality of positions of the target item and independent of further activation of the remote controller; and
   wherein acquiring a final positional coordinate corresponding to a final vertex point is performed responsive to receiving, at the laser scanner, a second signal from the remote controller indicating that the latest positional coordinate corresponds to the final vertex point.

8. The method of claim 1,
   wherein acquiring the first positional coordinate corresponds to an initial vertex point; and
   wherein acquiring additional positional coordinates corresponding to a plurality of respective vertex points is performed responsive to a signal received from the remote controller at each of the plurality of positions of the target item.

9. A scanning system comprising:
   a laser scanner having a field of view, the laser scanner further including a configuration mode for configuring a defined monitoring zone of the laser scanner; and
   a remote controller in communication with the laser scanner, the remote controller operable to transmit a signal to the laser scanner,
   wherein the laser scanner is configured to:
   enter a configuration mode,
   acquire a plurality of positional coordinates of a target item at a plurality of different locations within the field of view of the laser scanner;

aggregate the acquired positional coordinates to correspond to a respective plurality of vertex points that define the monitoring zone for the laser scanner; and
exit the configuration mode responsive to the monitoring zone being successfully defined.

10. The system of claim 9, wherein the target item is one of an object configured to be held by a person entering the field of view of the laser scanner or a part of the person entering in the field of view of the laser scanner.

11. The system of claim 9, wherein the laser scanner is further operable to analyze the positional coordinates corresponding to each of the vertex points and determine whether the defined monitoring zone is acceptable based on the positional coordinates satisfying a predetermined criteria.

12. The system of claim 9, wherein the laser scanner is further operable to generate a second signal indicating a successful acquisition of a respective positional coordinate.

13. The system of claim 12, wherein the second signal is at least one of an acoustic signal or a visual signal.

14. The system of claim 9, wherein the laser scanner is configured to determine whether the monitoring zone is successfully defined based on a geometry of the vertex points not overlapping within the field of view for the laser scanner.

15. The system of claim 9, wherein the laser scanner is configured to monitor continuous movement of an object to acquire one or more of the plurality of positional coordinates.

16. The system of claim 9, wherein the positional coordinates are determined based on an evaluation of a distance and an angular position of the target object with respect to the laser scanner.

17. The system of claim 9, further comprising a cluster of laser scanners including the laser scanner, the cluster of scanners configured in a master-slave configuration wherein each laser scanner is configured to define its monitoring zone in the same manner as the laser scanner.

18. The method of claim 6, wherein the second signal causes an indicator to be generated by the remote controller.

19. The method of claim 1, wherein aggregating the acquired positional coordinates to correspond to respective vertex points to determine the defined monitoring zone for the laser scanner is responsive to receiving a signal, at the laser scanner, that a latest positional coordinate is a final positional coordinate in a series of the positional coordinates.

20. The method of claim 1, further comprising exiting the configuration mode responsive to determining the defined monitoring zone for the laser scanner.

* * * * *